J. CHATTAWAY.
Primer.
No. 15,370.
Patented July 22, 1856.
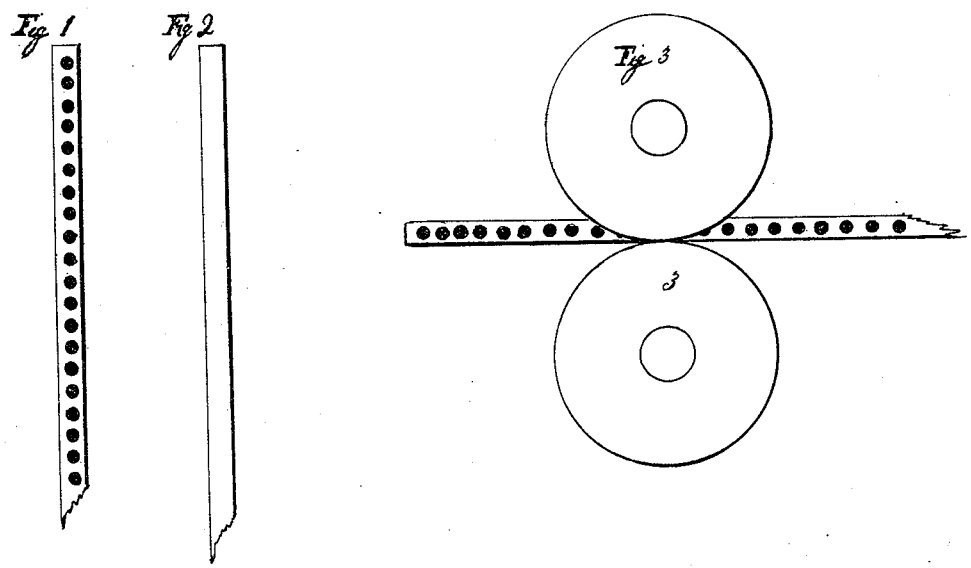

UNITED STATES PATENT OFFICE.

JAMES CHATTAWAY, OF SPRINGFIELD, MASSACHUSETTS.

IMPROVEMENT IN PERCUSSION-TAPE PRIMING.

Specification forming part of Letters Patent No. 15,370, dated July 22, 1856.

*To all whom it may concern:*

Be it known that I, JAS. CHATTAWAY, of Springfield, in the county of Hampden and State of Massachusetts, have invented a new and Improved Manner of Making Primers for all Kinds of Fire-Arms of Metals, securing the priming against all the effects of weather, water, and atmosphere, preserving the priming perfect in water, in all climates, and any length of time.

My mode of making the primer is as follows: I place the fulminating-powder in indentations of any desired form on a piece of metal prepared by a coating of alloy, composed of bismuth, lead, and tin, then I take another piece of metal prepared with a coating of alloy in the same way, and by submitting the two pieces of metal thus prepared to the pressure of heated rollers a union of the two pieces by this process of soldering, permanent and perfect, is effected.

What I claim as my invention is—

The improvement of substituting for paper metal hermetically sealed, and soldering of the continuous band so as to make it impervious to water, weather, or climate.

JAMES CHATTAWAY.

Attest:
  E. D. BEACH,
  A. A. WHITE.